Oct. 19, 1926.  1,603,598
J. G. HAWORTH
METHOD AND APPARATUS FOR PRODUCING PLATE GLASS
Filed June 23, 1926  2 Sheets-Sheet 1
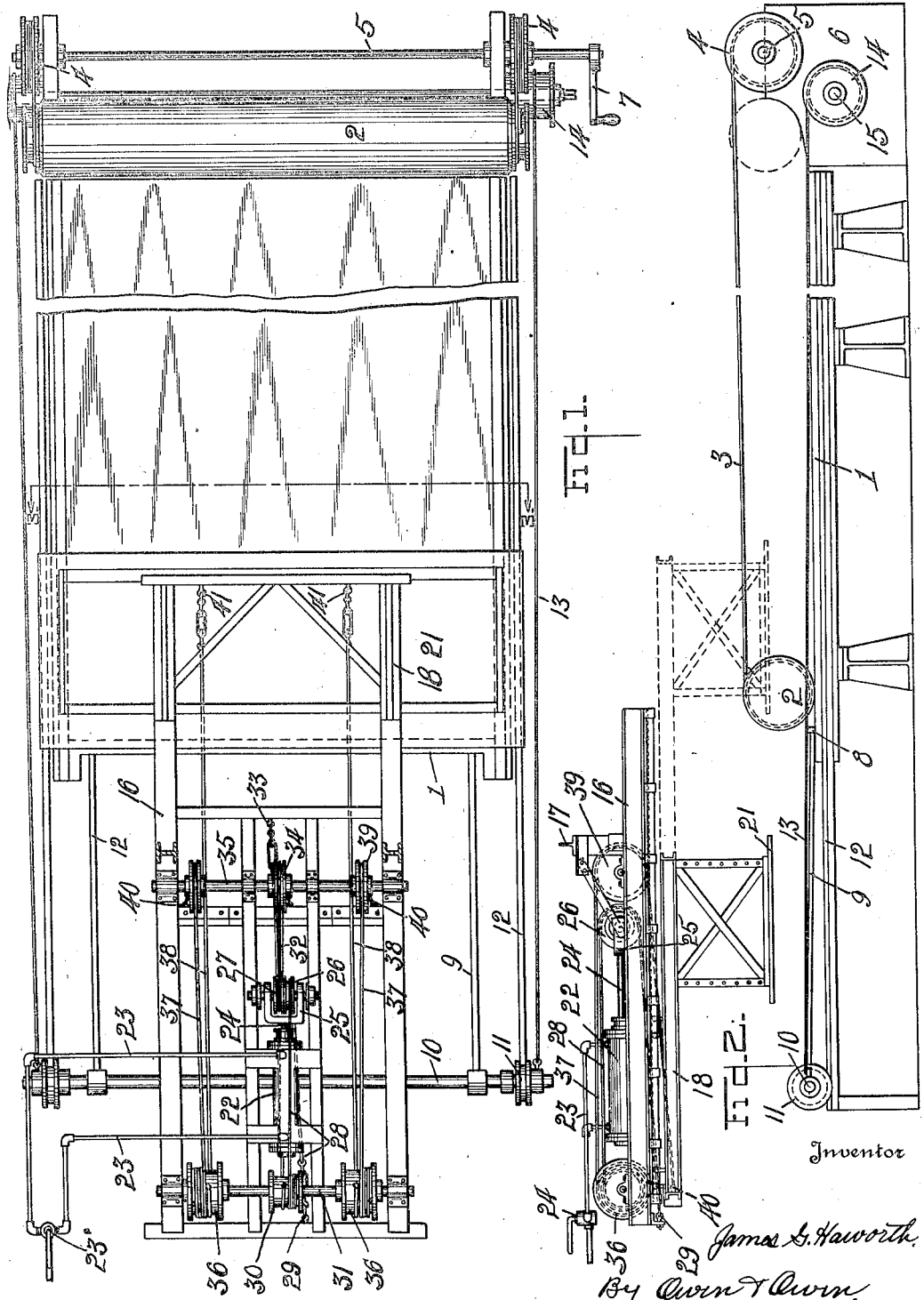

Oct. 19, 1926.
J. G. HAWORTH
1,603,598
METHOD AND APPARATUS FOR PRODUCING PLATE GLASS
Filed June 23, 1926    2 Sheets-Sheet 2
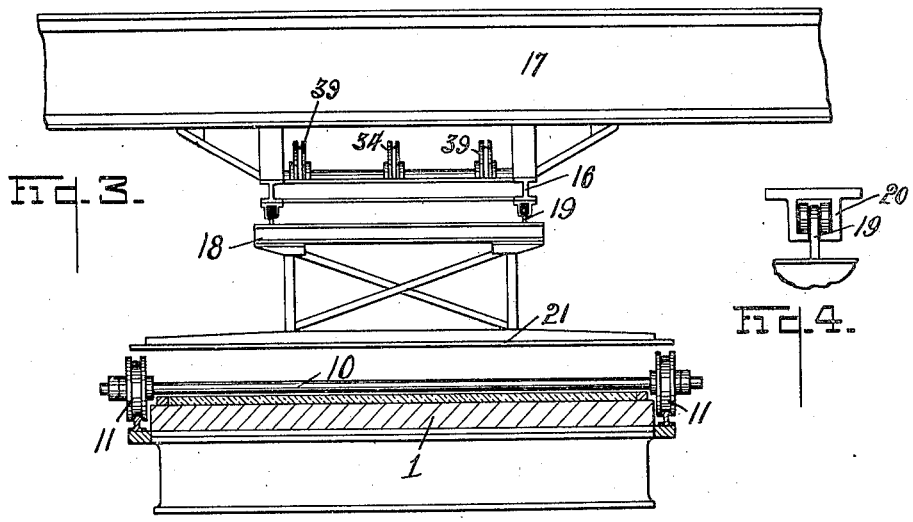
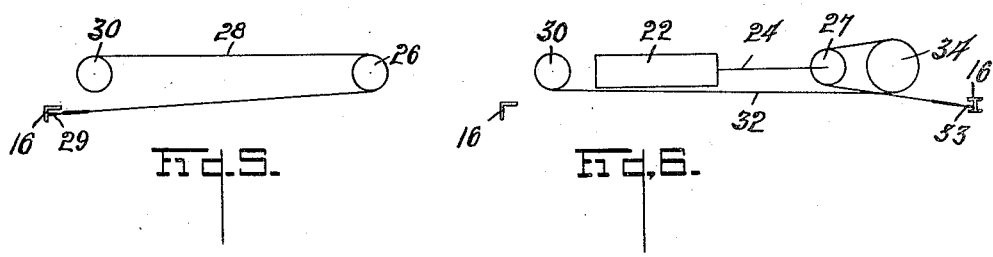
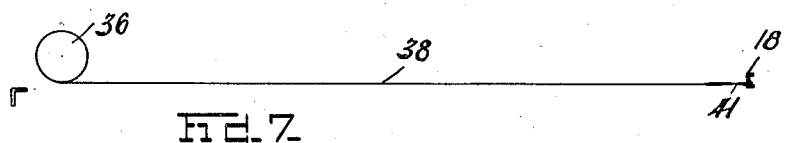
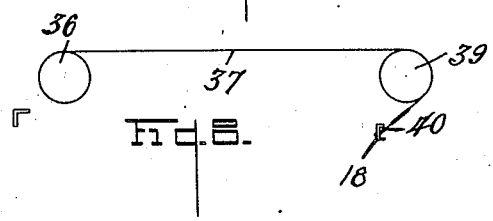
Inventor
James G. Haworth,
By Owen & Owen,
Attorneys Patented Oct. 19, 1926.

1,603,598

UNITED STATES PATENT OFFICE.

JAMES G. HAWORTH, OF ROSSFORD, OHIO, ASSIGNOR TO THE EDWARD FORD PLATE GLASS COMPANY, OF ROSSFORD, OHIO, A CORPORATION OF OHIO.

METHOD AND APPARATUS FOR PRODUCING PLATE GLASS.

Application filed June 23, 1926. Serial No. 117,930.

This invention relates to the manufacture of raw plate glass and apparatus used in connection therewith, and is particularly applicable to the production of plate glass on metal casting tables, the surfaces of which have been treated with black lead or graphite.

It has heretofore been common practice in the industry to use two distinct methods of preparing the surfaces of casting tables for the manufacture of plate glass, namely, (1) by covering the upper surface of the metal casting table with a thin layer of glass sand; and (2) by covering the upper surface of the casting table with black lead or graphite. The purpose in each case in treating the upper surface of the casting table is to prevent the molten glass from adhering to the casting table and likewise to permit the plate of glass after it is formed by rolling to be pushed or stowed across the casting table surface and into an annealing oven.

The disadvantage incident to the use of a layer of sand is that the abrasive action of the sand helps to wear down the upper surface of the table and the movement of the table segments and the opening of the joints between segments permits sand to enter between the segments and prevents their closing up tight, thus producing an imperfect table surface.

The use of graphite or black lead has the advantage of producing a surface which makes it easy to push or stow the plate into the ovens and does not have the disadvantage of wearing out the table, as is the case when sand is used. It is found, however, that the use of a graphite or black lead coating on the table has its disadvantages, inasmuch as the more intimate contact of the under-surface of the glass with the table surface in such case produces a more rapid radiation of heat from the glass sheet itself, and this results in irregular thickness of the glass sheets and in fire cracks and crizzles of extreme depth which are detrimental to the process of plate glass manufacture in its later steps. The uneven thickness and the fire cracks and crizzles mentioned are found to occur at the roller or welt end of the plate, this being the end which is first poured on the table and first rolled. The thickness is more uniform and the fire cracks are not so deep at the oven end of the plate, due to the fact that the welt end is first rolled into sheet form and must lie exposed to the table top and to the air not only while the rest of the plate is being rolled but also until the oven, or opposite, end of the plate has not only been rolled but allowed to cool sufficiently so that it may safely be pushed or stowed into the oven without buckling or folding.

Various means and methods have been tried for overcoming the uneven thickness of the sheet and the deep fire cracks and crizzles on the welt ends of glass plates cast on black lead or graphite surfaces, but, so far as I am aware, nothing has been discovered until now which will definitely control these defects.

The object of my invention is the provision of means over the casting table which tends to hold in the heat or to lessen the rapidity of cooling of the welt end of casting plates in order that such end of the plate shall be of the same character as to thickness and chill cracks as the oven end. It is found in practice that the means employed actually does produce a distinct benefit and an improved condition of the welt ends of the plates, both as to producing plates of a more uniform thickness and even surface, free from bumps and hollows, and as to the elimination of chill cracks and crizzles, and at the same time does away with the necessity for introducing shims at the welt end of the table in order to make the glass thicker at such end, as has been the custom in the past.

Further advantages of the invention are a slightly increased footage of glass per pot, and much better conditions for the grinding of the glass.

The invention is fully described in the following specification, and while in its broader aspect it is capable of embodiment in numerous forms, one embodiment of an apparatus for performing the invention is illustrated in the accompanying drawings, in which, Figure 1 is a plan view of a plate glass casting apparatus equipped with the roller and the heat protecting cover embodying the invention in their advanced positions. Fig.

2 is a side elevation thereof with the parts in retracted position. Fig. 3 is a cross-section on the line 3—3 in Fig. 1. Fig. 4 is a detail of a portion of Fig. 3, and Figs. 5, 6, 7 and 8 are diagrammatical views of different operating parts of the apparatus.

Referring to the drawings, 1 designates the usual casting table over which a roller 2 travels to roll into plate form a batch of glass deposited thereon. The glass-receiving surface of the table is preferably provided with a black lead or graphite coating. One end of a cable 3 is attached to and winds on each end of the roller 2 and the other end of each cable winds on a respective drum or windlass 4 carried by a shaft 5 journaled in standards 6 at the forward end portion of the table. A crank 7 is adapted to be attached to one end of the shaft 5 for turning the same. When the roller 2 is at the rear end of the table, a considerable portion of each cable is wound on the roller and a small portion thereof is wound on the drums 4 so that a turning of the drums will cause the cables to wind thereon from the roll and to effect a rolling of the roller to the forward end of the table. This arrangement is common in plate glass manufacture, and nothing novel is claimed for the same.

The stowing tool used for forcing the roll plate forward from the table 1 and into the annealing oven is designated 8 and is connected by arms 9 to a cross-shaft 10 at the rear end of the table, such shaft being provided with peripherally grooved wheels 11 for traveling on rails 12 lengthwise of the table. A cable 13 extends forward from each end of the shaft 10 to a respective drum 14 at the forward end of the table, so that a turning of the drums will draw the shaft 10 and stowing tool forward. The drums 14 are mounted on a common shaft 15.

Suspended or mounted in any suitable manner above the plane of the table 1 and at the rear thereof is a frame 16 which carries the means embodying the present invention. This frame, in the present instance, is shown as being suspended from an overhead girder 17.

A movable frame 18 is suspended from the underside of the frame 16 for reciprocatory movements lengthwise thereof, which is lengthwise of the table 1, the frame, in the present instance, being carried by roller hangers 19 (Figs. 3 and 4), the rollers of which travel in tracts 20 disposed lengthwise of the frame 16 at the underside thereof. Carried by the frame 18 at the underside thereof a suitable distance above the plane of the casting table 1 is what may be termed a cover plate 21 of plate form, which, when the frame 18 is at the rearward end of its movement, is disposed at the rear of the casting table 1 and when the frame is at the forward end of its movement it is disposed over the rear end of the casting table in position to stand over the welt end portion of a rolled plate of glass. The cover plate 21 in its present embodiment is of slightly greater width than the width of the cast plate and is preferably of a length substantially equal to one-third of the length of the plate.

The positioning of this cover plate over the welt end of the cast plate or the portion thereof which is first poured and rolled on the table acts to retard the cooling action of such portion of the plate, this being accomplished both by the reflection back against the plate of the heat waves radiating therefrom and also by the protection which is afforded by the close proximity of the cover member to the plate.

The means employed for imparting reciprocatory movements to the frame 18 and cover plate 21 will now be described. A cylinder 22 is carried by the frame 16 near its rear end with its axis disposed lengthwise of the frame, and a piston disposed therein is caused to have backward and forward movements imparted thereto by the admission of an operating fluid to one or the other ends of the cylinder through pipes 23, which are in communication with a source of supply through a control valve 23'. This valve, in the present instance, is manually controlled. The piston rod 24 projecting from the forward end of the cylinder 22 is provided at its outer end with a forked head 25 in which are mounted on a common shaft two sheaves 26 and 27 for free turning movements. A cable 28 is anchored at one end to the rear end of the frame 16 as at 29 and extends forward therefrom around the sheave 26 and then rearwardly to and winds around a drum 30, which is fixed on a cross-shaft 31 journaled in the rear portion of the frame 16, the cable being fixed at its end to such drum. It is apparent that upon a forward stroke of the piston rod from the restricted position shown in Fig. 1, the sheave 26 acting on the cable 28 will cause its drum end to unwind from and impart rotation to the drum 30 and through it to the shaft 31 due to the fact that the other end of the cable is anchored to the frame 16. Upon a reverse or inward movement of the piston rod the drum 30 and shaft 31 will be caused to turn in the opposite direction and effect a winding of the drum end of the cable 28 on the drum due to a cable 32 being anchored at one end to the forward end of the frame 16, as shown at 33, thence passing rearward around the sheave 27, thence forward over and around a sheave 34 on a cross-shaft 35 of the frame 16, and thence rearward and being fixed to and winding on the drum 30 in the opposite direction to the cable 28. It is thus evident that reciprocatory movements of the piston rod impart rotation first in one direction and then the other to the shaft 31 through the medium of the cables 28 and 32.

Fixed to the shaft 31 at opposite sides of the drum 30 are drums 36, each having a cable 37 and a cable 38 fixed at one end thereto and wound in opposite directions thereon, one being substantially unwound when the other is wound on the drum. Each cable 37 passes forward from its respective drum 36 around a sheave 39 on the adjacent end portion of the shaft 35 and then extends forward and attaches to the rear end portion of the frame 18 as at 40. Each of the other cables 38 extends forward from its drum 36 and attaches at its opposite end to the forward end portion of the frame 18 as at 41. It is evident that when the drums 36 are turned in a direction to wind the cables 37 thereon, the frame 18 will be moved forward and the cables 38 will unwind or pay out from the drums to permit such forward movement of said frame. When the direction of rotation of the drums 36 is reversed the cables 38 will be wound thereon and effect a rearward or retracting movement of the frame 18 and the cables 37 will unwind or pay out from the drums to permit such movement.

The forward movement of the frame 18 and its cover plate 21 should be timed to follow closely the forward movement of the casting roll 2 so that as soon as the rear or welt end portion of the glass plate has been rolled out on the table the cover plate will pass thereover and retard or regulate the cooling thereof during the remainder of the plate rolling operation. The provision of this cover plate over the welt end of the plate during the rolling operation so retards the cooling action of the plate relative to the remaining portion of the glass which is being rolled as to eliminate or reduce to a minimum the chill cracks and crizzles which would otherwise be present in the welt end portion of the plate, and also produces a plate which is free from bumps and hollows and is of more uniform thickness and even surface than has heretofore been the case with rolled plates. By producing a plate of uniform thickness, the necessity of introducing shims at the welt end of the table in order to make the glass thicker at such end, as has heretofore been the custom, is avoided and such uniform thickness also has the advantage of slightly increasing the footage of glass per pot and of producing a plate of much better condition for grinding.

The method which I practice in producing rolled plate glass which is free from cracks and crizzles at the welt end thereof and is of substantially uniform thickness throughout its length consists in depositing a batch of molten glass on the casting table adjacent to the rear end thereof and in advance of the casting roll 2, then advancing the roll to roll the batch in flat sheet or plate form on the table and immediately after rolling the welt end portion of the glass, and while the rolling of the glass is continuing, retarding the radiation of heat from the welt end portion of the rolled plate, this latter step being accomplished in the present case by moving a protecting member over the welt end portion of the plate.

I wish it understood that my invention is not limited to any specific construction, arrangement or form of the parts, or to the particular method described, as it is capable of numerous modifications and changes without departing from the spirit of the claims.

Having thus described my invention, what I claim as new and desire to secure by Letters Patent is:

1. The method of producing plate glass by the rolling process, which consists in depositing a batch of molten glass on a table in advance of a flattening roll, then advancing the roll to flatten the glass on the table and retarding the radiation of heat from the welt end portion of the plate during the continuance of the rolling process.

2. In combination, a plate glass casting table, means for progressively flattening a batch of glass on the table, and a member movable over a portion of the table and the initially formed end portion of the glass plate for retarding the cooling of such portion of the plate.

3. In combination, a plate glass casting table, means for progressively flattening a batch of molten glass thereon, and a cover plate mounted for movements relative to the casting table and movable over the welt end portion of the glass plate to retard the cooling thereof during a flattening of the remaining portion of the glass.

4. In combination, a means for progressively flattening a batch of molten glass in plate form, and a cover plate disposed above the flattened welt end portion of the glass plate to retard the cooling thereof during the flattening of the remaining portion of the plate.

5. In combination, means for flattening a batch of molten glass in plate form, means mounted for reciprocatory movements over and away from the welt end portion of the glass plate and having a part which when over the glass plate retards the cooling of the welt end portion thereof.

6. In combination, means for flattening a batch of molten glass in plate form, means mounted for reciprocatory movements over and away from the welt end portion of the glass plate and having a part which when over the glass plate retards the cooling of the welt end portion thereof, and means operable to reciprocally move said last mentioned means.

7. In combination, means for progressively flattening molten glass in plate form, a stationary frame above the plane of said means, a member carried by said frame and movable over the welt end portion of a glass plate to retard the cooling thereof during the flattening process, and means carried by the frame and operable to impart movements in first one direction and then the other to the frame.

In testimony whereof, I have hereunto signed my name to this specification.

JAMES G. HAWORTH.